US008972646B2

(12) United States Patent
Ranganathan et al.

(10) Patent No.: US 8,972,646 B2
(45) Date of Patent: Mar. 3, 2015

(54) SUPERSPEED INTER-CHIP INTERFACE (75) Inventors: Sridharan Ranganathan, San Ramon, CA (US); David J. Harriman, Portland, OR (US); Anoop Mukker, Folsom, CA (US); Satheesh Chellappan, Folsom, CA (US); Karthi R. Vadivelu, Folsom, CA (US); Shalini Sharma, Folsom, CA (US); Zeeshan Sarwar, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 231 days.

(21) Appl. No.: 13/435,926

(22) Filed: Mar. 30, 2012

(65) Prior Publication Data
US 2013/0262731 A1 Oct. 3, 2013

(51) Int. Cl.
*G06F 13/14* (2006.01)
*G06F 13/40* (2006.01)

(52) U.S. Cl.
CPC ................... *G06F 13/4027* (2013.01)
USPC ........................................... 710/315; 710/305

(58) Field of Classification Search
USPC ...................... 710/300–315, 104–110, 62–64
See application file for complete search history.

(56) References Cited

U.S. PATENT DOCUMENTS

| 8,437,343 | B1 * | 5/2013 | Wagh et al. | 370/359 |
|---|---|---|---|---|
| 8,745,300 | B2 * | 6/2014 | Kuo | 710/310 |
| 2010/0275037 | A1 * | 10/2010 | Lee et al. | 713/189 |
| 2011/0106989 | A1 * | 5/2011 | Solomon et al. | 710/63 |
| 2012/0059957 | A1 * | 3/2012 | Millsaps | 710/46 |
| 2012/0265911 | A1 * | 10/2012 | Connolly | 710/300 |
| 2013/0191568 | A1 * | 7/2013 | Hershko et al. | 710/106 |
| 2013/0191679 | A1 * | 7/2013 | Zhuang et al. | 713/503 |
| 2014/0068135 | A1 * | 3/2014 | Harriman et al. | 710/313 |

* cited by examiner

*Primary Examiner* — Raymond Phan
(74) *Attorney, Agent, or Firm* — International IP Law Group, P.L.L.C.

(57) ABSTRACT

An interface for low power, high bandwidth communications between units in a device in provided herein. The interface comprises a USB 3.0 system interface and a SuperSpeed inter-chip (SSIC) protocol adaptor configured to facilitate communications between the USB 3.0 system interface and an M-PHY interface.

20 Claims, 6 Drawing Sheets

SUPERSPEED INTER-CHIP INTERFACE

TECHNICAL FIELD

The present invention relates to the use of inter-chip communications in devices using the SuperSpeed inter-chip (SSIC).

BACKGROUND ART

Mobile computing and communications platforms, such as smartphones and tablets, often consist of an application processor system-on-a-chip (SoC) and other hardware devices such as a cellular modem, wireless networking (WiFi) devices, and NAND storage devices. Communications between these hardware components require the definition of an interface, hardware components, such as a controller, to implement the interface, and an associated software stack to control the communication. The development of the required hardware and software components and the subsequent tuning to ensure the implementation is optimal is a resource intensive exercise that can impact the time to market of the solutions. Currently inter-chip communications are handled by a High Speed Inter-Chip interface used inside the platform to communicate with devices. However this interface is limited to 480 Mbps and does not provide bandwidth scalability. As used herein, inter-chip indicates communications inside the device, which may be between chips or internal circuit boards.

The universal serial bus (USB) is a ubiquitous peripheral-interconnect of choice for a large number of computing and consumer applications. Many systems provide a comprehensive set of software drivers to support commonly available USB peripherals. Further, there is an existing USB ecosystem that includes USB silicon suppliers, design houses, and verification and testing vendors that lower the cost of implementation for product manufacturers of USB hosts and peripherals. The USB 3.0 specification adds support for transfer speeds of 5 Gbps to address the need for higher bandwidth. However the USB 3.0 specification does not meet the requirements of embedded inter-chip interfaces with respect to power and EMI robustness.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Current USB 3.0 specifications provide for high speed interfacing, e.g., up to about 5 GB or higher, with external devices. However, the standard USB 3.0 SuperSpeed interfaces cannot be used inside mobile platforms for always-connected devices because of the high power consumption of the SuperSpeed physical layer (PHY). For example, as the SuperSpeed PHYs are designed to drive cables of about three meters in length, the power requirements are much higher than needed for inter-chip communications within a device. Further, the drivers used for interfacing with external devices do not tune the communications frequency to avoid EMI problems with other devices, such as internal radio modems used with mobile providers for wireless wide area network (WWAN) communications. To address this need, embodiments described herein implement a Super Speed Inter-Chip (SSIC) interface as an optimized inter-chip version of USB 3.0.

The SSIC interface combines the robust software support for the SuperSpeed protocol with a low-power Mobile Industry Processor Interface (MIPI) Physical Layer (M-PHY) to provide an interface that can be used in mobile platforms with minimal resource investment. Unlike standard SuperSpeed, which is often fixed at 5 Gbps, SSIC provides scalable bandwidth starting as low as 1.25 Gbps to reduce the power consumption of the interface. The SSIC uses the MIPI M-PHY specification as the physical layer of the interconnect to meet the requirements of embedded inter-chip interfaces. The MIPI M-PHY specification describes a serial physical layer technology with high bandwidth capabilities, which is specifically developed for mobile applications to obtain low pin count combined with very good power efficiency.

However, the M-PHY specification was developed assuming that new operating and access software would be developed to replace current software interfaces. The SSIC protocol adaptor, described in embodiments herein, functions as an intermediate unit between a standard USB 3.0 SuperSpeed media access controller (MAC) and an M-PHY unit, translating responses between each of the connected units, and providing high speed communications while allowing reuse of current technologies.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Figure 1:
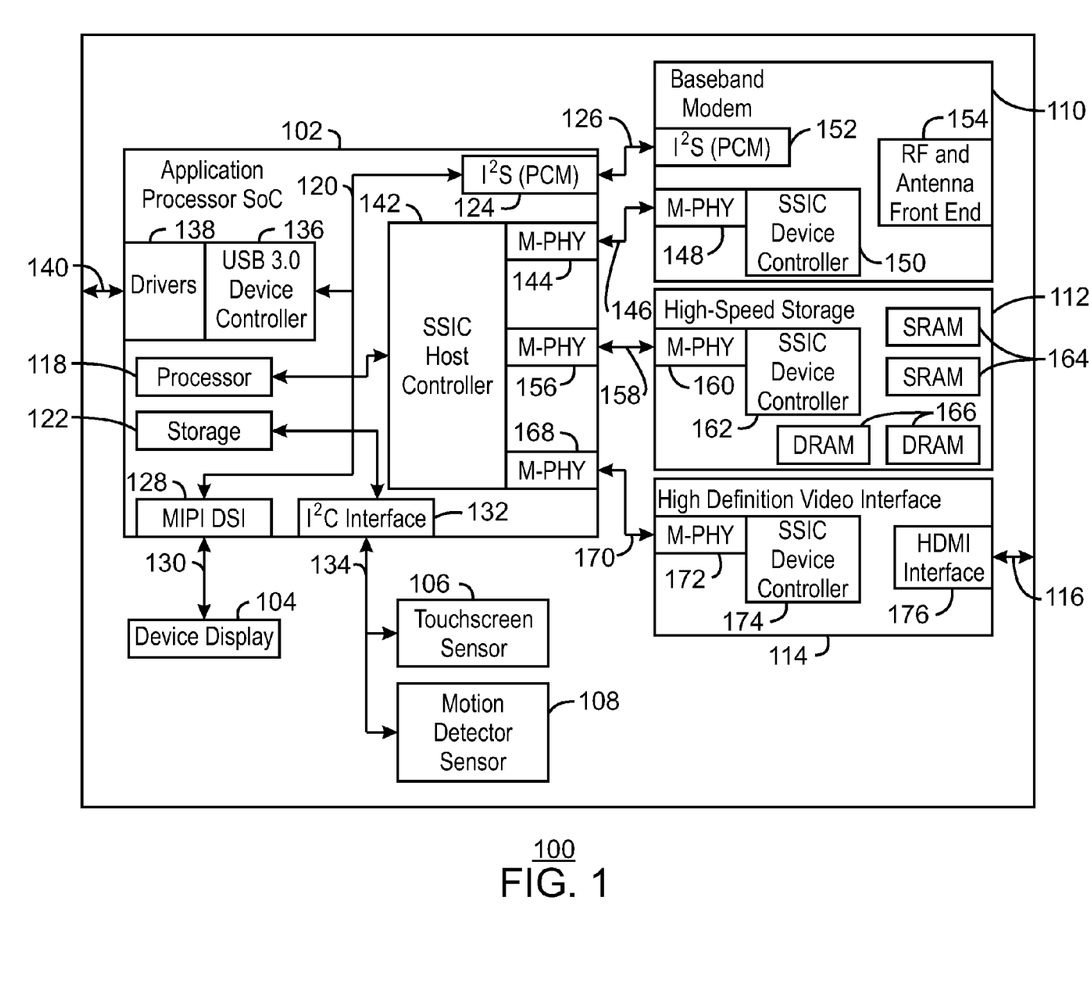
FIG. 1 is a block diagram of a computing system that may be used in accordance with embodiments.

FIG. 1 is a block diagram of a computing system 100 that may be used in accordance with embodiments. The computing system 100 may include a smartphone, a tablet, a laptop computer, a desktop computer, a server node, and the like. In the exemplary embodiment illustrated in FIG. 1, the computing device 100 includes a number of units or chips built into the device that can be used to implement a smartphone or tablet functionality.

For example, the computing device 100 can include a system on a chip (SoC) 102 that is used to implement the basic operations of the computing device 100. A display device 104 may be included to provide output from the SoC 102 to a user. A touchscreen sensor 106 and a motion sensor 108 can be used to provide user input to the computing device 100. A baseband modem 110 can be used to connect the computing device 100 to a wireless wide area network (WWAN), such as a mobile phone network. The computing device 100 may also include a high speed storage system 112 that can be used, for example, to store large amounts of data that needs to be transferred at a high bandwidth, such as video and audio files. As used herein, a video file includes both video and audio data, and may include high resolution video images, such as those at a non-interlaced resolution of 1920×1080 (under the 1080p specification). A high definition video interface 114 may be included to transfer video files to external devices through an cable connected to a port 116. It can be understood that not all of these units are present in all embodiments. Further, any number of other units may be included to add other functionality, such as an audio system to play audio files, and a wireless network adapter (WIFI) used to connect to wireless local area networks (WLANs), among others.

The SoC 102 may further include a processor 118 and a number of other systems that are coupled to the processor 118 by an SoC fabric 120, or bus. For example, the SoC 102 may be coupled through the SoC fabric 120 to a storage system 122. The storage system 122 may include any combinations of dynamic ram (DRAM), static ram (SRAM), read only memory (ROM), and registers associated with the processor 118. The storage system 122 can be used to hold operational data and programs that, when executed by the processor 118, provide the basic functionality of the SoC 102, and, thus, the computing device 100. For example, the programs may include a phone functionality used to place voice calls to the WWAN over the baseband modem 110, for example, through an I$^2$S interface 124 that encodes the voice signal using pulse code modulation (PCM). A PCM interface 126 can be used to exchange the PCM signals with the baseband modem 110.

The SoC 102 drives the device display 104 using a display driver, for example, a MIPI DSI 128 (mobile industry processor interface—display serial interface) coupled to the SoC fabric 120. The MIPI DSI 128 is coupled to the device display 104 through a high speed point-to-point serial bus 130 that includes a high speed clock lane and one or more data lanes. An I$^2$C interface 132 can be included in the SoC fabric 120 to drive an I$^2$C bus 134, which can be used to couple the touchscreen sensor 106 and the motion sensor 108 to the SoC 102.

The SoC 102 may include a USB 3.0 interface to provide a high speed interface, for example, up to 5 GB/s, with devices on an an external USB 3.0 bus. The USB 3.0 interface may include a USB 3.0 device controller 136 coupled to the SoC fabric 120, and high power drivers 138 configured to drive a USB cable through a port 140 on the device.

In embodiments described herein, the SoC 102 may include a SuperSpeed Inter-Chip (SSIC) host controller 142 coupled to the SoC fabric 120. The SSIC host controller 142 is configured to allow communications between the SoC 102 and high speed devices located within the computing device 100. For example, these devices may include the baseband modem 110, the high speed storage system 112, and the high definition video interface 114, among others.

The SSIC Host controller 142 may be linked to multiple M-PHYs for interfacing to specific devices. For example, a first M-PHY 144 can drive a super speed serial interface 146 to an M-PHY 148 located within the baseband modem 110. The M-PHY 148 in the baseband modem 110 is coupled to an SSIC device controller 150, which is coupled to the fabric or bus of the baseband modem 110. The fabric of the baseband modem 110 may also contain an I$^2$S interface 152 that can be coupled to the PCM interface 126 to accept PCM signals from the SoC 102. An RF and antenna front end 154 in the fabric of baseband modem 110 can be used to couple the computing device 100 to a WWAN for both voice and data communications. High speed data communications, such as the fourth generation (4G) mobile services may occur at substantial bandwidths, benefiting from the high speed communications through the SSIC interface with the SoC 102.

A second M-PHY 156 coupled to the SSIC host controller 142 in the SoC 102 can drive a super speed serial interface 158 to an M-PHY 160 located within the a high speed storage system 112. The M-PHY 160 is coupled to an SSIC device controller 162, which is coupled to the fabric or bus of the high speed storage system 112. The fabric of the high speed storage system 112 may also include any combinations of memory or storage devices, such as SRAMs 164 or DRAMs 166. As described, the a high speed storage system 112 may be used to hold large files that require high bandwidth for adequate playback, such as high definition video files. Accordingly, the high speed storage system 112 may benefit from the SSIC interface to the SoC 102. Further, the serial interface 158 to the a high speed storage system 112 may be formed from multiple lanes, wherein each lane includes paired transmitting and receiving lines. Each lane may, for example, be supported by a single set of M-PHYs at the device and the host, and thus, a multi-lane approach may include grouping multiple M-PHYs to increase the bandwidth.

Another M-PHY 168 coupled to the host controller 142 in the SoC 102 can drive a serial interface 170 to a M-PHY 172 located within the high definition video interface 114. The M-PHY 172 is coupled to an SSIC device controller 174, which is coupled to the fabric or bus of the high definition video interface 114. The fabric of the high definition video interface 114 can include, for example, a high definition multimedia interface (HDMI) 176 used to drive a television, or other device, through a cable connected to the port 116. As for the high speed storage system 112, the bandwidth requirements for video files may benefit from the SSIC. Further, a multi-lane approach that combines multiple M-PHYs may also be used to increase the bandwidth of the communications to the high definition video interface 114.

Each of the SSIC controllers described above may use a similar structure, allowing reuse of hardware and software modules. Further, in embodiments described herein, a new type of intermediate interface, or bridge, between current high speed controllers and M-PHY units allows the reuse of numerous modules used in current technologies. As described herein, the bridge is termed a SSIC protocol adaptor, and is discussed further with respect to FIG. 2

Figure 2:
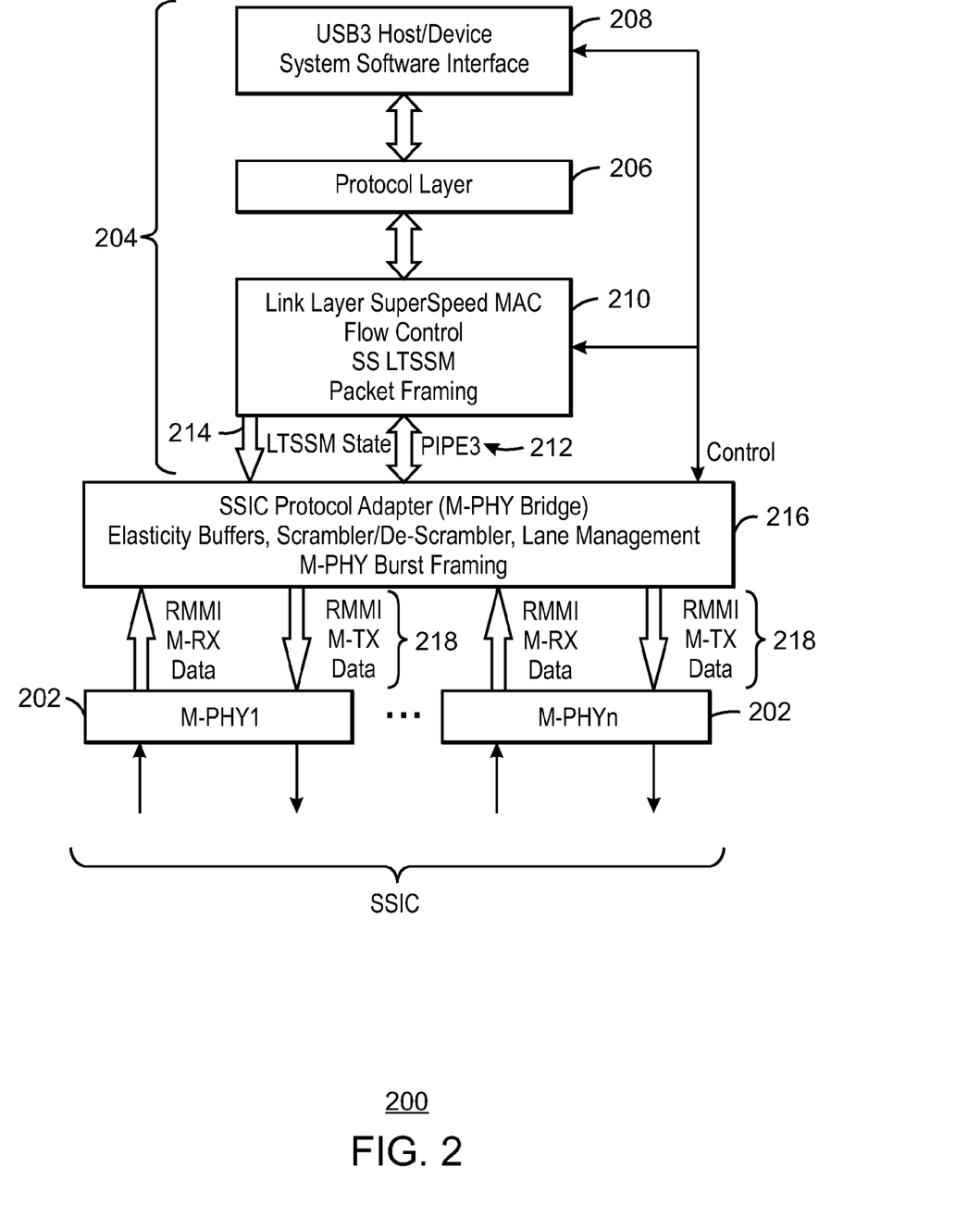
FIG. 2 is a schematic of a SSIC (SuperSpeed Inter-Chip) implementation that may be used in accordance with embodiments.

FIG. 2 is a schematic of a SSIC (SuperSpeed Inter-Chip) implementation 200 that may be used in accordance with embodiments. The SSIC implementation 200 consists of one or more M-PHYs 202 that interface with a SSIC controller stack 204 that includes both hardware and software components. The SSIC controller stack 204 is similar to current USB 3.0 SuperSpeed controllers in the protocol layer 206 and the USB 3.0 system software interface 208 to allow existing SuperSpeed software to be reused.

Figure 3:
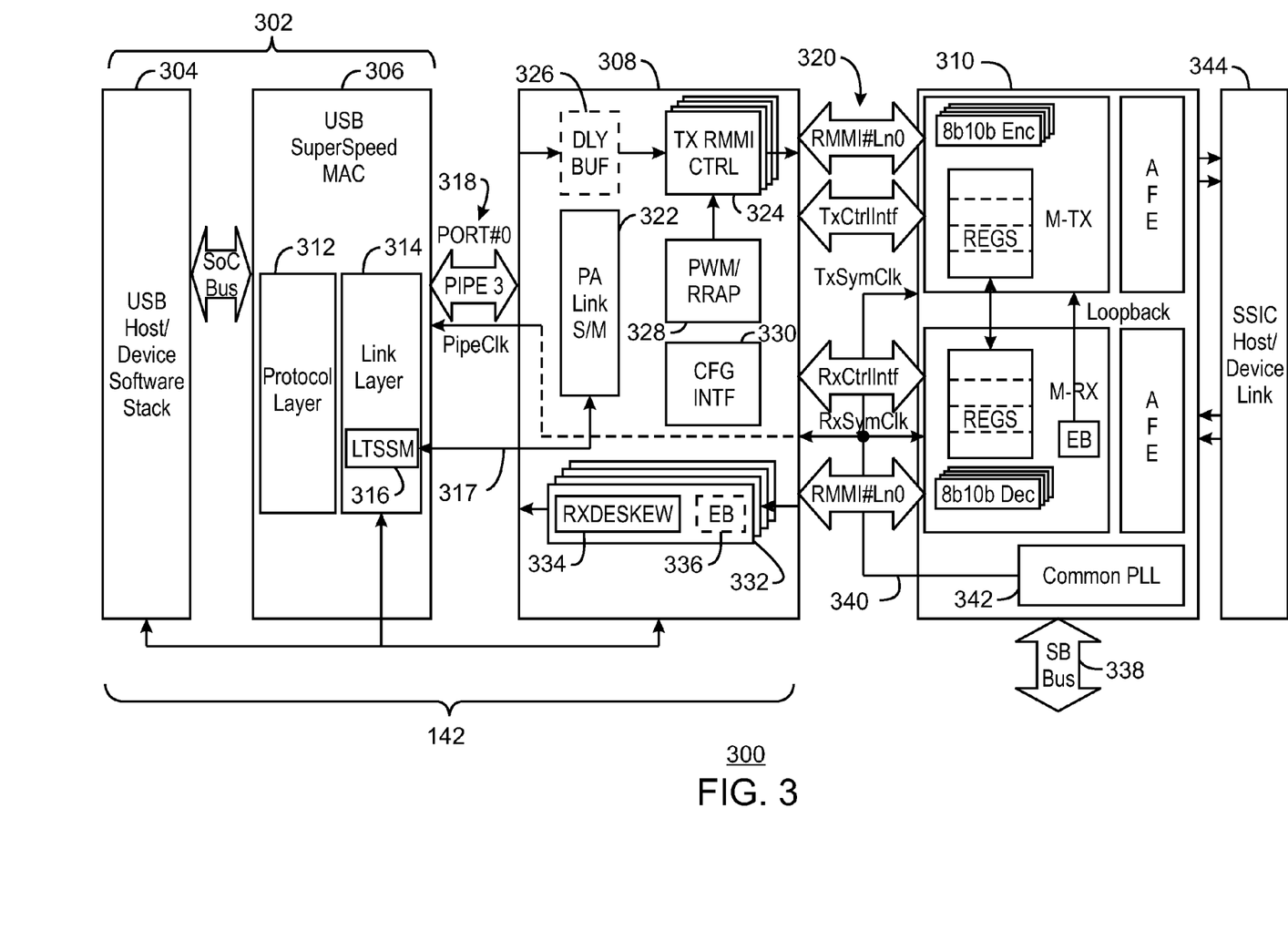
FIG. 3 is a block diagram of a SSIC implementation accordance with embodiments.

The link layer 210 provides flow control, training and validation signals, and packet framing for the communications link, as described further with respect to FIG. 3. The link layer 210 may also be constructed from currently available modules to allow reuse of developed technologies. The link layer 210 provides a USB 3.0 compliant interface termed PIPE3 212, which is often used to interface with high power drive circuits for communications with external equipment. The link layer 210 also provides an interface for a Link Training Status State Machine (LTSSM) 214 which provides control for the SSIC.

In an embodiment described herein, a separate M-PHY bridge block, or SSIC protocol adaptor 216 provides bridging logic between the link layer 210 and the M-PHYs 202. The logic performs specific functions related to SSIC including transferring signals between the PIPE3 interface of the link layer 210 and the Reference M-PHY MODULE Interface (RMMI) 218 of each of the M-PHYs 202. The SSIC protocol adaptor 216 implements mechanisms to allow the SSIC implementation 200 to make the upper layers, for example, the SSIC controller stack 204, operate as if it were connected to a normal USB 3.0 SuperSpeed link. This functionality can be performed by tracking the Link Training Status State Machine (LTSSM) 214 and providing the expected responses to the link layer 210.

The SSIC implementation 200 combines the current software support for the USB 3.0 SuperSpeed protocol of the SSIC controller stack 204 with the low-power MIPI M-PHYs 202 to enable an SSIC implementation 200 that can be leveraged by mobile platforms with minimal resource investment.

Unlike standard SuperSpeed which is often fixed at 5 Gbps, the SSIC implementation 200 provides scalable bandwidth starting as low as 1.25 Gbps to reduce the power consumption of the interface. This is discussed in further detail with respect to FIG. 3.

FIG. 3 is a block diagram of a SSIC implementation 300 in accordance with embodiments. Referring also to FIG. 1, the SSIC implementation 300 can be used to provide the SSIC communications link between the SoC 102 and the other devices, such as the baseband modem 110, the high speed storage 112, or the high definition video 114. In either host or device units, the SSIC implementation 300 includes a control stack 302 that includes a USB software stack 304 and a USB 3.0 SuperSpeed media access control (MAC) 306. As described herein, a bridge layer, termed a SSIC protocol adaptor 308, is included in the SSIC implementation 300 to provide an interface between the control stack 302 and a MIPI M-PHY 310. The USB software stack 304, USB 3.0 SuperSpeed MAC 306, and the SSIC protocol adaptor 308 form the SSIC host controller 142 described with respect to FIG. 1.

The USB 3.0 SuperSpeed MAC 306 is capable of operation at different link speeds as defined by the SSIC specification, for example, by a high speed gear and rate. The USB software stack 304 does not change from a standard USB 3.0 SuperSpeed for the SSIC implementation 300. In the USB 3.0 SuperSpeed MAC 306, the protocol layer 312 also has no change in the SSIC implementation 300. However, the link layer 314 in the USB 3.0 SuperSpeed MAC 306 may have some changes for the SSIC implementation 300, which are defined in the SSIC specification. For example, the LTSSM state machine 316 may be reconfigured to have bidirectional communications, such as a handshaking line 317 to stay in synchronization with the SSIC protocol adaptor 308. To track the link states, and control the communications, the USB 3.0 SuperSpeed MAC 306 communicates LTSSM state information 316 and data packets with the SSIC protocol adaptor 308 through a PIPE3 interface 318.

The SSIC protocol adaptor 308 implements the communications between the PIPE3 interface 308 of the USB 3.0 SuperSpeed MAC 306 and the Reference M-PHY MODULE Interface (RMMI) 320 of the M-PHY 310. The SSIC protocol adaptor 308 implements mechanisms to allow the USB 3.0 SuperSpeed MAC 306, and the USB software stack 304, to operate as if they were connected to a USB 3.0 SuperSpeed link, for example by tracking the LTSSM 316 and providing the expected responses on the link.

To perform these functions, the SSIC protocol adaptor 308 communicates the USB 3.0 packets from the PIPE3 interface 318 to the M-PHY 310 through the RMMI 320 and maps the SuperSpeed power states for SSIC. A single PIPE3 interface 318 can be interfaced to multiple RMMIs 320 to provide multilane communications, as shown in FIG. 1. For example, multiple M-PHYs 144, 156, and 168 may be used with a single SSIC host controller 142. Further, the SSIC protocol adaptor 308 handles the transmit Scrambler and receive Descrambler as described in the SSIC specification.

Further, the SSIC protocol adaptor 308 may adjust link speeds to minimize EMI interferences between units in the device, for example, changing the data transfer rate if a baseband modem shifts to a similar frequency. These functions are implemented by the individual blocks within the SSIC protocol adaptor 308, as described in further detail below.

The PA LINK SM (physical adaptor link state machine) 322 represents the main state machine for the SSIC protocol adaptor 308. The PA LINK SM 322 converges the MIPI M-TX and M-RX data and power states to create the data and power states for the PIPE3 interface 318. The PA LINK SM 322 also handles the high level controls for various modes of operation and speed. The receiver detection and LFPS reception (low frequency periodic signal) is supported as defined in the specification for the PIPE3 interface 318. The warm reset, link connect, and link disconnect are all implemented in the PA LINK SM 322. The USB 3.0 SuperSpeed LTSSM state is tracked to translate the PIPE3 power and data state to RMMI power and data state, allowing the USB 3.0 SuperSpeed MAC to function as if connect to a normal USB 3.0 SuperSpeed link.

The TX RMMI CTRL 324 (transmit RMMI control block) is controlled by the PA LINK SM 322. The TX RMMI CTRL 324 includes the Scrambler in the high speed (HS) data path and the transmit data multiplexing. The TX RMMI CTRL 324 interfaces with the M-TX lines of the RMMI interface 320 for burst traffic. The TX RMMI CTRL 324 is also responsible for lane management in a multi-lane configuration. In a multi-lane configuration the transmit data from PIPE3 interface is striped across different lanes on the RMMI data lanes.

The TX DLY BUF 326 may be included for U0.STALL SUPPORT, e.g., when the M-PHY 310 is in a STALL mode while the USB 3.0 SuperSpeed MAC 306 is transmitting. As described further with respect to Table 1, consecutive Logical Idle (LI) states are detected to enter MIPI M-PHY STALL state in M-TX. The U0.STALL SUPPORT is implemented in the SSIC protocol adaptor 308 and is transparent to the USB SuperSpeed MAC 306.

The PWM/RRAP 328 implements pulse width modulation (PWM) low speed (LS) burst and Remote Register Access Protocol (RRAP) support. RRAP may be used to program registers in a remote device M-PHY. During RXDETECT.LS-MODE, when the link is configured for automatic profile programming, the PWM/RRAP 328 accepts access commands from the PA LNK SM 322. When configured for non-automatic mode, software is involved and this block accepts access commands from software or firmware.

The CFG INTF (configuration interface) 330 handles the programming of local MIPI M-PHY profile registers for both M-TX and M-RX. The main functionality is entry and exit of HIBERN8 state, change of high-speed (HS) mode, such as to HS-BURST mode, and upgrading or downgrading gear and rates. The CFG INTF 330 receives access commands from the PA LINK SM 332 or from software or firmware.

The RX CTRL 332 interfaces with the M-RX lines of the RMMI interface 320. The functions of this block include the MIPI power state decode on M-RX, deskew 334 for correcting multi-lane data that is subject to different delay times, and a Descrambler for HS data. The RX CTRL 332 may also include an elastic buffer 336, for example, when elastic buffers in a multiple M-PHY implementation are disabled.

An elastic buffer 336 may be enabled in the receive data path to manage mismatches between operating frequencies in the host and the device. If a multi-lane implementation is implemented, the lane to lane deskew management can be handled in coordination with functionality in the elastic buffer 334. Skew refers to lane to lane delay mismatches caused by different transmission delays from source to destination or by independent lanes having elastic buffers, for example, implemented in the M-PHY 310. Accordingly, to simplify deskewing, the elastic buffers in the M-PHYs used in a multi-lane configuration may be disabled.

For multi-lane configurations, the major function of the RX CTRL 332 is the management of deskewing. The implementation of the deskew buffer 334 involves looking for burst markers using a MK0 symbol and a SKP insertion or deletion function. The markers are used to align data streams on different lanes. Thus, the integrity of the incoming data is maintained across lanes. A per lane Descrambler is implemented for a multi-lane configuration. After descrambling, the received data from multiple lanes is concatenated and sent to the received data lines in the PIPE3 interface 318. The RX CTRL 332 also translates the individual M-PHY lane power state to PA LINK SM 322 to indicate the power state of the PIPE3 interface 318. During a low speed pulse width modulation (PWM) mode the received data is not descrambled but is sent to the PWM/RRAP 328.

The MIPI M-PHY 310 is the physical layer for the SSIC link, and is compliant to the MIPI M-PHY specifications. The MIPI M-PHY 310 implements the high bandwidth serial physical layer at different high-speed (HS) gears and rates. It also supports bit or PWM scheme at gear 1 (low speed) for programming a remote M-PHY profile. The M-PHY 310 interfaces with the SSIC protocol adaptor 308 via the RMMI interface 320. In most implementations, a sideband (SB) bus 338 is present to program the registers in the M-PHY 310. The sideband bus 338 is coupled to the fabric of the SoC by a port, allowing direct access to the M-PHY registers. The MIPI M-PHY 310 can also provide a common clock signal 340 for the SSIC implementation 300, for example, from a phase locked loop (PLL) 342.

The SSIC Host/Device Link 344 can be either a USB Host or Device controller. This link is compliant to SSIC [SSIC] specification. For a Host link this controller has the Host function and USB system software and application. For a Device link this controller has the Device driver and functionality. The physical layer of the link is compliant to MIPI M-PHY [MPHY].

Establishing Communications

The SSIC protocol adaptor establishes and maintains communications between a USB SuperSpeed MAC and an M-PHY layer, for example, by mapping expected states and transitions between the MAC and M-PHY as shown in Table 1. Thus, the functionality of the M-PHY is generally not visible to the MAC, outside of handshaking lines, and the MAC performs as if connected to a standard high speed USB 3.0 PHY (physical layer). To the software at the operating system level and higher, the link generally appears to be a standard USB 3.0.

The process for establishing communications begins at state 1, in which the link training and status state machine in the MAC is in a SuperSpeed disabled state (SS.DISABLED). At this point, the M-PHY is also powered down (Unpowered/Disable). The link is in this state when the link is not powered, or if a local reset has been asserted. When the LTSSM transitions to a more active state, for example, by deasserting a local reset, the MAC transitions as shown in state 2, from SS.DISABLED to RX.DETECT. The SSIC protocol adaptor can then transition the M-PHY from disabled to HIBERN8.

The SSIC protocol adaptor does not take action on RX.DETECT commands (state 3) issued by the LTSSM of the MAC, but returns a "no device detected" response to keep the MAC holding for a link. Meanwhile, the SSIC protocol adaptor uses the M-PHY detection mechanisms to determine if any other devices are coupled to the link. Specifically, the M-PHY transmitter (Tx) sends a zero signal, termed DIFF N (or DIF N) to trigger activation of coupled devices (Tactivate), while the M-PHY receiver looks for DIFF N to trigger receiving (Tactivation).

Once the M-PHY detects activation, e.g., by a coupled device, the link system may enter state 4. This occurs when MPHY Tx has completed sending DIFF-N for Tactivate and MPHY Rx has received a corresponding DIFF-N signal. The SSIC protocol adaptor than brings the M-PHY into a high-speed (HS) state, in which it is ready to send training symbols.

Training symbols are a set of data patterns that are used by the receiver to establish a high speed link with a transmitter. After training is complete, the SSIC protocol adapter sends the MAC a signal that a device is coupled to the link, changing the state from RX.DETECT to POLLING. The state of the M-PHY is changed from HIBERN8 to STALL to await data packets from the MAC.

TABLE 1

Mapping of MAC LTSSM to M-PHY by SSIC protocol adaptor

| State (Transition) | SS LTSSM | M-PHY Tx & Rx |
|---|---|---|
| 1 | SS.DISABLED | Unpowered/Disabled |
| 2 | SS.DISABLED -> RX.DETECT | Disabled -> HIBERN8 |
| 3 | RX.DETECT.* | HIBERN8 |
| 4 | RX.DETECT -> POLLING | HIBERN8-> STALL |
| 5 | POLLING.X | STALL |
| 6 | POLLING.X -> U0 | STALL -> HS-BURST |
| 7 | U0 | HS-BURST (<-> STALL) |
| 8 | U0-> U3 | HS-BURST -> (STALL) -> HIBERN8 |
| 9 | U3 | HIBERN8 |
| 10 | U3-> U0 | HIBERN8-> (STALL) -> HS-BURST |

At this point, communications is established between the devices, and high speed data packets are transferred. To the system, a normal USB 3.0 high speed communications link has been established between the host and device. The SSIC protocol adaptor is passing data between the MAC and the M-PHY to be sent on through the link. The system software in the software stack can then determine the device type and load the appropriate driver, for example, from system memory or from the device itself. Communications are occurring in HS BURST mode through the SSIC protocol adaptor.

If a data pause is desired, for example, there is a period where no data is sent, the SSIC protocol adaptor can drive the M-PHY into a STALL mode, as shown in state 5. STALL is an opportunistic state that conserves power during the M-PHY communications, and is invisible to higher levels. For example, during STALL of the M-PHY, the MAC continues looking for data transfers by remaining in Polling mode. Either end of the link can go into STALL mode, for example, the SSIC protocol adaptor drives the M-PHY Tx to drive DIFF N onto the link to bring Tx in STALL, or receives a DIFF N from the other device's M-PHY that takes M-PHY Rx to STALL.

Once data is available for sending or receiving, as indicated by a series of signals exchanged between the M-PHYs, in state 6, the SSIC protocol adaptor changes the M-PHY status from STALL back to HS-BURST, and signals the MAC that the status can be changed from POLLING to U0 (normal communications). In this implementation, again, neither the M-PHY nor the MAC are aware of the other, as each is receiving the expected signals provided by the SSIC protocol adaptor. This state carries over to state 7, in which the MAC assumes that normal communications are occurring (U0) and the M-PHYs are moving back and forth between HS BURST and STALL as data is available on the link. Shorter pauses in data transmission can be made during the communications by the SSIC protocol adaptor having the MPHY-TX insert filler symbols orlogical idle (LI) symbols, while the MPHY-Rx removes these symbols accordingly. The transitions in these states is transparent to the MAC.

During the POLLING state, data sent may only used to train the link between M-PHYs used in USB 3.0 and to configure the devices. In contrast, the U0 state is actual communications state. During U0, actual data communications is taking place, including device configuration, the loading of drivers, and the exchange of substantive data.

If data amounts should drop, such as if communications are temporarily ended between device and host, the SSIC protocol adaptor may accept a signal indicating that the MAC is switching from U0 to a U3 (communications paused) state, as shown in state 8. U0 to U3 transition happens when the system software has no further data to send through the MAC. The SSIC protocol adaptor can then switch the M-PHY from HS-BURST to STALL, and then to HIBERN8. As shown in state 9, the MAC can remain in U3, and the M-PHY in HIBERN8, for as long as there is no further data to be sent between the devices.

Once there is need for communications to be resumed, as shown in state 10, the MAC can switch indicate that the state is preparing to go from U3 to U0, and the SSIC protocol adaptor can reestablish communications. In this case, the MAC sends packets for retraining the link, which are essentially ignored by the SSIC protocol adaptor. The SSIC protocol adaptor uses the M-PHY to retrain the link, then switches the M-PHY from HIBERN8 to STALL, and finally to HS-BURST. At that point, the SSIC protocol adaptor can inform the MAC that communications have been established, and the state can change from U3 to U0. Once communications are established, the packet stream can be communicated between the devices as described with respect to FIG. 4.

Figure 4:
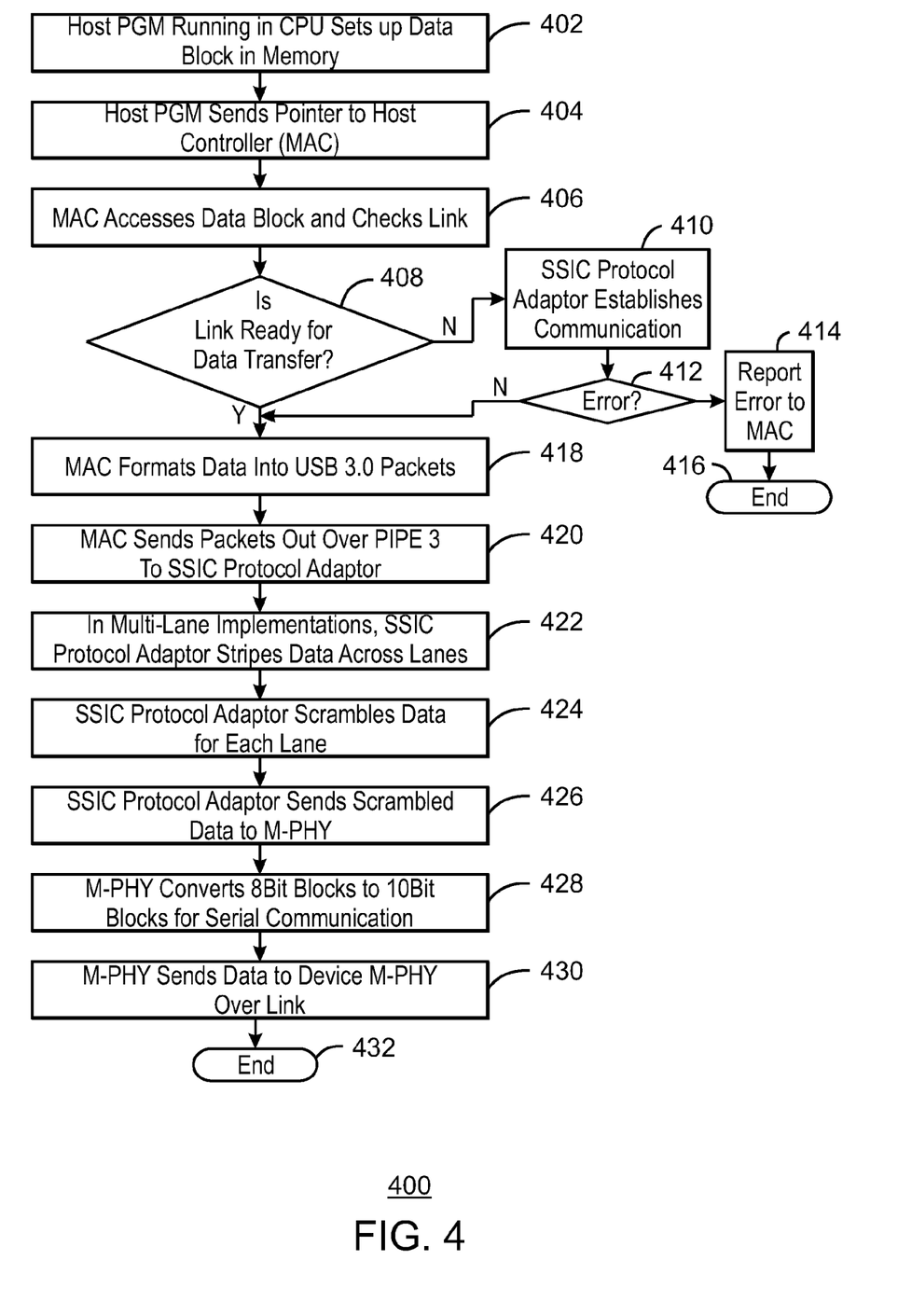
FIG. 4 is a flow chart of a method for sending data over a SSIC link in accordance with embodiments.

FIG. 4 is a flow chart of a method 400 for sending data over a SSIC link in accordance with embodiments. To simplify the description, the procedure is defined as a transfer of a packet stream from a USB software stack to a device through a link. The method 400 begins at block 402, where a program running in the memory of a system, such as the SoC 102 discussed with respect to FIG. 1, sets up a data block for transfer, specifically by saving the data in a contiguous region in the memory. At block 404, the host program sends a pointer for the memory location (and a number of bytes) to the host controller, for example, in the MAC, that the block is ready and should be transferred to another device over a USB 3.0 interface. At block 406, the MAC accesses the data block and checks the link for operation. At block 408, the MAC determines if the link is ready for use. It can be understood that the MAC functions as if the link is a USB 3.0 SuperSpeed link, and is not generally aware of the SSIC link, outside of the handshaking used to maintain synchronization with the SA Link SM 322 (FIG. 3). If the link if not ready, the SSIC protocol adaptor, which is monitoring the LTSSM commands from the MAC, establishes the communications link at block 410. This may be performed by the techniques discussed with respect to Table 1. If an error occurs during the establishment of the link, as determined at block 412, the SSIC protocol adaptor reports a USB 3.0 formatted error to the MAC at block 414, and processing ends at block 416.

If the communications are established with no errors, flow proceeds to block 418. At block 418, the MAC formats the bitstream from the memory block into USB 3.0 packets. At block 420, the MAC sends the packets to the SSIC protocol adaptor over the PIPE3 interface.

In multi-lane implementations, at block 422, the SSIC protocol adaptor stripes data across the multiple lanes to provide a higher apparent bandwidth for the link. At block 424, the SSIC protocol adapter then scrambles the data for each lane. Scrambling uses an algorithm to randomize the bit patterns on a line to manage the energy and frequencies on the wires of the link. This prevents the energy demand from being greater than can be provided by the drivers and lowers EMI between devices. The algorithm is known to the SSIC protocol adaptors at each end of the link to allow the data to be descrambled at the device. At block 426, the SSIC protocol adaptor sends the data to the M-PHY for transmission. At block 428, the M-PHY converts 8 bit blocks to 10 bit blocks for the serial link. The encoding allows the regeneration of a clock signal at the other end of the serial link without having to use a dedicated line for a clock. At block 430, the M-PHY sends the data to the corresponding M-PHY in the device.

The processing then terminates at block 432. This may be done once symbols are returned from the corresponding device M-PHY indicating that the data was successfully received. Further, the SSIC protocol adaptor may receive an LTSSM command indicating that the MAC has entered a U3 mode. In response to this, the SSIC protocol adaptor may place the M-PHY in a STALL mode, and subsequently in a HIBERN8 mode. If the MAC remains in U0, but not more data is forthcoming, the SSIC protocol adaptor may place the M-PHY in a STALL mode and after a subsequent time delay, place the M-PHY into a HIBERN8 mode.

Figure 5:
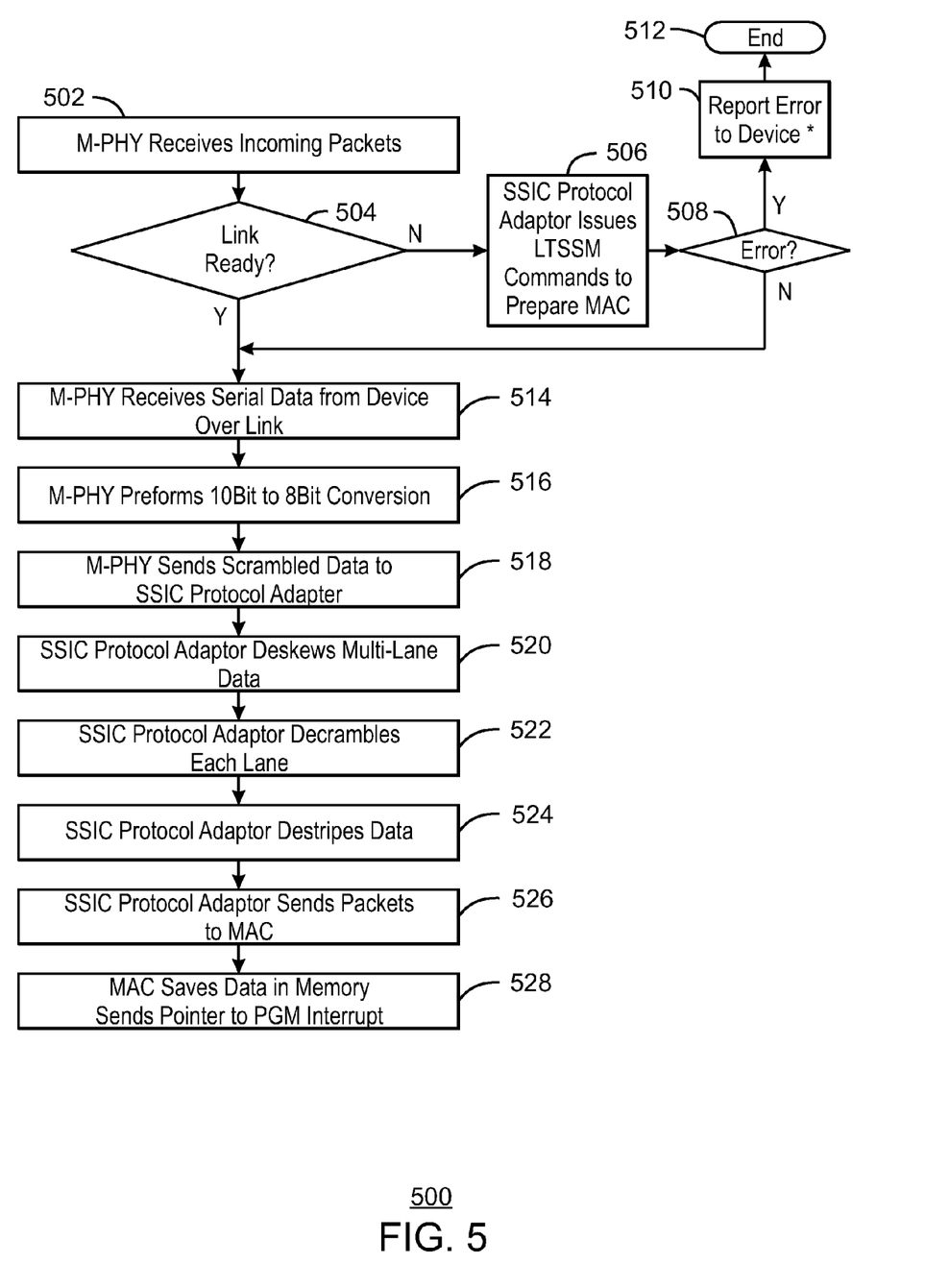
FIG. 5 is a flow chart of a method for SSIC communications in a device in accordance with embodiments.

FIG. 5 is a flow chart of a method 500 for SSIC communications in a device in accordance with embodiments. The method 500 begins at block 502 when the M-PHY receives signalling packets from a corresponding M-PHY on another device indicating that the other device is ready to send data packets. At block 504, the SSIC protocol adaptor determines whether the link is ready. If not, at block 506, the SSIC protocol adaptor issues LTSSM commands to inform the MAC that data transfers are about to start. If the MAC issues an error, as determined at block 508, the SSIC protocol adaptor may wait or may reissue the command. If the MAC still reports an error, as determined at block 508, at block 510, the error may reported to the device. Processing then ends at block 512. If no error message is identified at block 508, or the MAC has reported ready at block 504, process flow proceeds to block 514.

At block 514, the M-PHY receives serial data from the device over the link. At block 516, the M-PHY converts 10 bit blocks to 8 bit blocks, reforming packet data. At block 518, the packet data are sent to the SSIC protocol adaptor over the RMMI interface. If a multi-lane implementation is used, at block 520, the SSIC deskews the lanes to compensate for differences in time delays over the lines.

At block 522, the SSIC protocol adaptor then descrambles the bit stream to reform a packet stream. In a multi-lane implementation, at block 524 the data is destriped from the multiple lanes to reconstitute the packet stream sent by the device.

At block 526, the SSIC protocol adaptor sends the packet stream to the MAC. At block 528, the MAC sends the data on to the host, for example, by saving the data in a memory block and providing an interrupt signal with a memory location and bite length.

It can be understood that the flow charts of FIGS. 4 and 5 merely illustrate an exemplary embodiment. Some of the blocks may be omitted in various embodiments, while additional blocks may be added in other embodiments.

Figure 6:
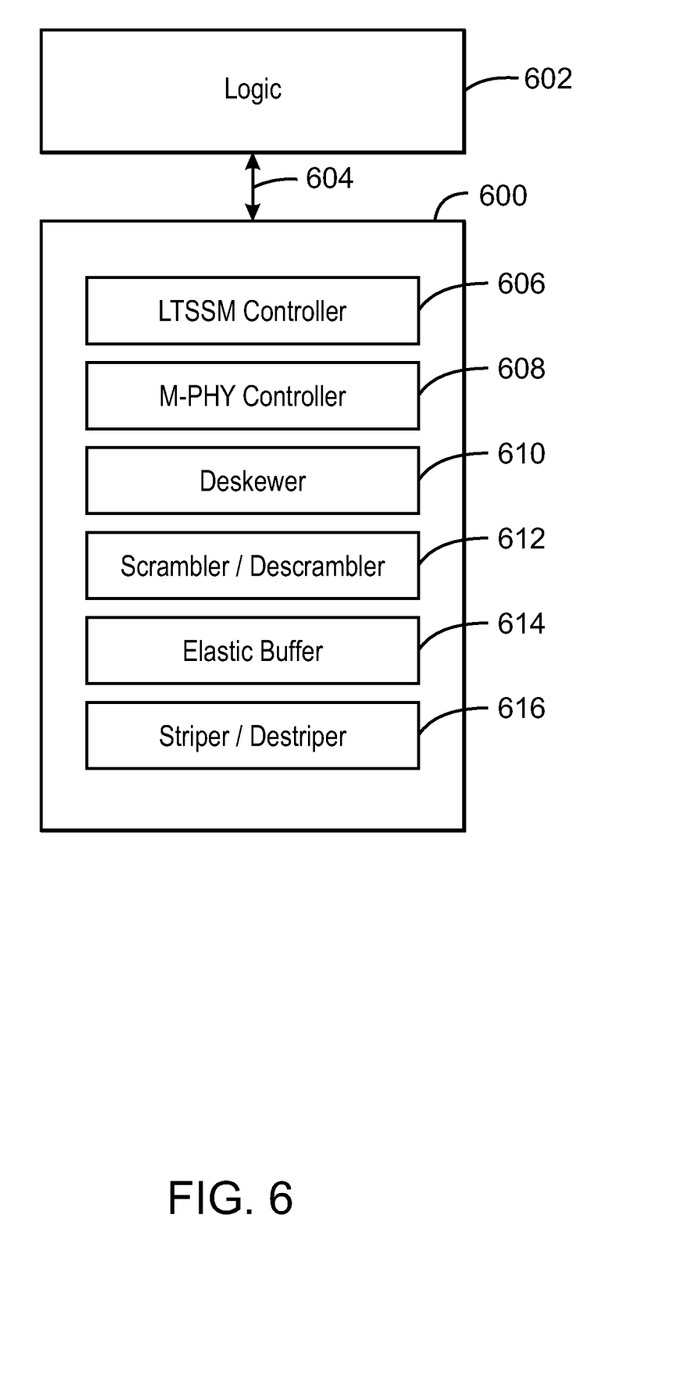
FIG. 6 is a non-transitory machine readable medium that holds programs for implementing SSIC communications in accordance with embodiments.

FIG. 6 is a non-transitory machine readable medium 600 that holds data and programs for implementing SSIC communications in accordance with embodiments. The non-transitory machine readable medium 600 may be a RAM or ROM holding programs, or a hard-wired logic module, on the SSIC protocol adaptor 308. The non-transitory machine readable medium 600 may be accessed by logic 602, for example, the PA link SM 322 as discussed with respect to FIG. 3. The non-transitory machine readable medium 600 may provide modules, such as hardwired circuits or programs, that when executed by the logic 602 over a control link 604, perform control functions for the SSIC protocol adaptor. An LTSSM controller 606 can be included to provide the commands that are expected by the MAC during a normal USB 3.0 communications session. An M-PHY controller 608 can be provided to provide the control signals that are expected by the M-PHY during a communications session. A deskew 610 may be included to deskew multi-lane data, as described above. A scrambler/descrambler 612 may be included to scramble and descramble packet streams to balance energy on interconnecting wires. In some embodiments, an elastic buffer 614 may be included to replace elastic buffers in connected M-PHY units. A striper/destriper 616 may be included to pull strip outgoing data onto multiple lanes for transmission, and to pull received data from multiple lanes and concatenate the data into single data stream.

Example 1

An interface for low power, high bandwidth communications between units in a device is described herein. The interface includes a universal serial bus (USB) 3.0 system interface and a SuperSpeed inter-chip (SSIC) protocol adaptor configured to facilitate communications between the USB 3.0 system interface and an M-PHY interface.

The SSIC protocol adaptor may be configured to map SuperSpeed power states for SSIC. The SSIC protocol adaptor may be configured to map a single PIPE3 interface to multiple M-PHYs. The SSIC protocol adaptor can include a transmit scrambler and a receive descrambler.

The USB 3.0 system interface includes a USB software stack and a USB SuperSpeed MAC. The USB SuperSpeed MAC includes a protocol layer comprising a USB 3.0 protocol generator and a link layer comprising a Link Training Status State Machine (LTSSM).

The SSIC protocol adaptor can include a transmitter Reference M-PHY Module Interface control block (TX RMMI CTRL) configured to receive data from a PIPE3 interface of the MAC and place the data on an M-TX line on an RMMI interface to an M-PHY. The TX RMMI CTRL can be configured to manage multiple lanes in multi-lane configurations. Further, the TX RMMI CTRL can be configured to stripe data across the multiple lanes in the RMMI data lines.

The SSIC protocol adaptor can include a receiver Reference M-PHY Module Interface control block (RX RMMI CTRL) configured to receive data from the M-RX line on an RMMI interface from a M-PHY, descramble the data, concatenate the data, and place the data on a PIPE3 receive data line.

The SSIC protocol adaptor may be coupled to a number of M-PHYs. At least two of the M-PHYs are used to provide a multi-lane configuration. The M-PHY may be external to the device.

Example 2

A method for implementing SSIC communications between units in a device is disclosed herein. The method includes receiving USB 3.0 packets in a SSIC protocol adaptor from a media access controller (MAC). The USB 3.0 packets are scrambled in the SSIC protocol adaptor and the scrambled packets are sent to an M-PHY for transmission over a serial link.

The method can include receiving scrambled packets in a SSIC protocol adaptor from the M-PHY, descrambling the scrambled packets to form USB 3.0 packets, and sending the USB 3.0 packets to the MAC.

In the method, communications may be established by issuing Link Training Status State Machine (LTSSM) signals to the MAC to control the communications. The M-PHY may be placed in a STALL mode without affecting the state of the MAC. Further, the M-PHY link may be moved between the STALL mode and an HS-BURST mode without affecting the state of the MAC. The M-PHY link may be trained from the SSIC protocol adaptor without using the training commands issued by the MAC.

Example 3

At least one non-transitory machine readable medium is disclosed herein. The at least one non-transitory machine readable medium includes instructions stored therein that, in response to being executed on a computing device, cause the computing device to issue link training and status state machine (LTSSM) commands to a media access controller and issue M-PHY commands to an M-PHY.

The at least one non-transitory machine readable medium of claim 15, may also include instructions stored therein that, in response to being executed on a computing device, cause the computing device to scramble outgoing packets before sending the packets to an M-PHY and descramble incoming packets from an M-PHY.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. An interface for low power, high bandwidth communications between units in a device, comprising:
    a universal serial bus (USB) system interface; and
    a protocol adaptor based on a SuperSpeed inter-chip (SSIC) protocol configured to facilitate communications between the USB system interface and an M-PHY interface.

2. The interface of claim 1, wherein the protocol adaptor is configured to map SuperSpeed power states for SSIC.

3. The interface of claim 1, wherein the protocol adaptor is configured to map a single PHY Interface for Peripheral Component Interconnect (PCI) Express, Serial Advanced Technology Attachment (SATA), and Universal Serial Bus (USB) SuperSpeed architectures (PIPE3 interface) to multiple M-PHYs.

4. The interface of claim 1, wherein the protocol adaptor comprises:
    a transmit scrambler; and
    a receive descrambler.

5. The interface of claim 1, wherein the USB system interface comprises:
    a USB software stack; and
    a USB SuperSpeed MAC, comprising:
        a protocol layer comprising a USB protocol generator; and
        a link layer comprising a Link Training Status State Machine (LTSSM).

6. The interface of claim 1, wherein the protocol adaptor comprises a transmitter Reference M-PHY Module Interface control block (TX RMMI CTRL), configured to:
    receive data from a PIPE3 interface of the MAC; and
    place the data on a Mobile Industry Processor Interface (MIPI) transmitter (M-TX) line on a Reference M-PHY Module Interface (RMMI) to a M-PHY.

7. The interface of claim 1, wherein the protocol adaptor comprises a receiver Reference M-PHY Module Interface control block (RX RMMI CTRL), configured to:
    receive data from the Mobile Industry Processor Interface (MIPI) receiver (M-RX) line on an RMMI from a M-PHY;
    descramble the data;
    concatenate the data; and
    place the data on a PIPE3 receive data line.

8. The interface of claim 1, wherein the protocol adaptor is coupled to a plurality of M-PHYs.

9. The interface of claim 1, wherein the M-PHY is external to the device.

10. The interface of claim 4, wherein the TX RMMI CTRL is configured to manage multiple lanes in multi-lane configurations.

11. The interface of claim 4, wherein the TX RMMI CTRL is configured to stripe data across multiple lanes in RMMI data lines.

12. The interface of claim 8, wherein at least two of the plurality of M-PHYs are used to provide a multi-lane configuration.

13. A method for implementing SuperSpeed inter-chip (SSIC) communications between units in a device, comprising:
    receiving USB packets in a protocol adaptor based on an SSIC protocol from a media access controller (MAC);
    scrambling the USB packets in the SSIC protocol adaptor; and
    sending the scrambled packets to an M-PHY for transmission over a serial link.

14. The method of claim 13, comprising:
    receiving scrambled packets in the protocol adaptor from the M-PHY;
    descrambling the scrambled packets to form USB packets; and
    sending the USB packets to the MAC.

15. The method of claim 13, comprising establishing communications by issuing Link Training Status State Machine (LTSSM) signals from the protocol adaptor to the MAC to control the communications.

16. The method of claim 13, comprising training the M-PHY link from the protocol adaptor without using the training commands issued by the MAC.

17. The method of claim 13, comprising placing the M-PHY in a STALL mode without affecting the state of the MAC.

18. The method of claim 13, comprising moving the M-PHY link between STALL mode and HS-BURST mode without affecting the state of the MAC.

19. At least one non-transitory machine readable medium comprising instructions stored therein that, in response to being executed on a computing device, cause the computing device to:
- issue link training and status state machine (LTSSM) commands to a media access controller; and
- issue M-PHY commands to an M-PHY.

20. The at least one non-transitory machine readable medium of claim 19, comprising instructions stored therein that, in response to being executed on a computing device, cause the computing device to:
- scramble outgoing packets before sending the packets to an M-PHY; and
- descramble incoming packets from an M-PHY.

* * * * *